United States Patent Office 2,756,227
Patented July 24, 1956

2,756,227

QUATERNARY SALTS AND METHOD OF PREPARATION

Donald W. Heseltine, Rochester, N. Y., assignor to Eastman Kodak Company, Rochester, N. Y., a corporation of New Jersey No Drawing. Application December 28, 1953, Serial No. 400,809

10 Claims. (Cl. 260—240)

This invention relates to a method of preparing quaternary salts which are useful in the preparation of sensitizing dyes. More particularly, this invention relates to an improved method for making heterocyclic quaternary salts and to new products.

British Patent 625,907, accepted July 6, 1949, describes a method for making heterocyclic quaternary salts which are useful in the preparation of photographic sensitizing dyes. However, the intermediates which are obtained according to the process described in this patent are evidently contaminated with a material which interferes with certain dye condensations. For example, the intermediates described in the British patent cannot be condensed with so-called ICI intermediates to produce dicarbocyanine dyes which can be isolated from the reaction mixture.

Accordingly, it would be desirable to have intermediates of the type described in British Patent 625,907 which were of sufficient purity to undergo condensations which cannot be undertaken using the British patent's intermediates.

It is, therefore, an object of my invention to provide an improved process for preparing intermediates useful in the preparation of photographic sensitizing dyes. A further object of my invention is to provide new intermediates which are useful in the preparation of photographic sensitizing dyes. Other objects will become apparent from a consideration of the following description and examples.

According to my invention, I realize the above objects by condensing together a cyclammonium quaternary salt selected from those represented by the following general formula:

I.
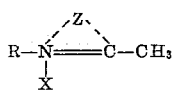

wherein R represents an alkyl group, such as methyl, ethyl, n-propyl, isopropyl, n-butyl, isobutyl, β-hydroxyethyl, carboxymethyl, carbethoxymethyl, β - methoxyethyl, benzyl (phenylmethyl), allyl (vinylmethyl), etc., X represents an anion, such as chloride, bromide, iodide, perchlorate, thiocyanate, acetate, methylsulfate, ethylsulfate, benzenesulfonate, toluenesulfonate, etc., and Z represents the non-metallic atoms necessary to complete a heterocyclic nucleus containing five atoms in the heterocyclic ring, such as those selected from the group consisting of those of the thiazole series (e. g. thiazole, 4-methylthiazole, 5-methylthiazole, 4-phenylthiazole, 5-phenylthiazole, 4,5-dimethylthiazole, 4,5-diphenylthiazole, 4-(2-thienyl)thiazole, etc.), those of the benzothiazole series (e. g. benzothiazole, 4-chlorobenzothiazole, 5-chlorobenzothiazole, 6-chlorobenzothiazole, 7-chlorobenzothiazole, 4-methylbenzothiazole, 5-methylbenzothiazole, 6-methylbenzothiazole, 5-bromobenzothiazole, 6-bromobenzothiazole, 4-phenylbenzothiazole, 5-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxy- benzothiazole, tetrahydrobenzothiazole, 5,6-dimethoxybenzothiazole, 5,6-dioxymethylenebenzothiazole, 5-hydroxybenzothiazole, 6-hydroxybenzothiazole, etc.), those of the naphthothiazole series (e. g. α-naphthothiazole (i. e.[2,1]-naphthothiazole), β-naphthothiazole (i. e. [1,2]-naphthothiazole), 5-methoxy-β-naphthothiazole, 5-ethoxy-β-naphthothiazole, 7-methoxy-α-naphthothiazole, 8-methoxy-α-naphthothiazole, etc.), those of the benzoxazole series (e. g. benzoxazole, 5-chlorobenzoxazole, 5-phenylbenzoxazole, 5-methylbenzoxazole, 6-methylbenzoxazole, 5,6-dimethylbenzoxazole, 4,6-dimethylbenzoxazole, 5-methoxybenzoxazole, 6-methoxybenzoxazole, 5-ethoxybenzoxazole, 6-chlorobenzoxazole, 5-hydroxybenzoxazole, 6-hydroxybenzoxazole, etc.), those of the naphthoxazole series (e. g. α-naphthoxazole, β-naphthoxazole, etc.), those of the benzoselenazole series (e. g. benzoselenazole, 5-chlorobenzoselenazole, 5-methoxybenzoselenazole, 5-hydroxybenzoselenazole, tetrahydrobenzoselenazole, etc.), those of the napthoselenazole series (e. g. α-naphthoselenazole, β-naphthoselenazole, etc.), those of the thiazoline series (e. g. thiazoline, 4-methylthiazoline, etc.), with a ketone selected from those represented by the following general formulas:

II.
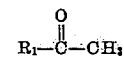

and

III.
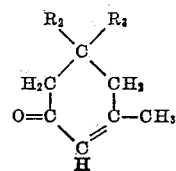

wherein $R_1$ represents a carbocyclic aromatic group, such as phenyl, o-, m,- and p-tolyl, o-, m-, and p-chlorophenyl, o-, m-, and p-hydroxyphenyl, o-, m-, and p-methoxyphenyl, α-napthyl, β-naphthyl, 2,5-dimethylphenyl, p-dimethylaminophenyl, p - diethylaminophenyl, 9 - phenanthryl, etc., or a heterocyclic radical, such as 2-thienyl, etc., $R_2$ represents a hydrogen atom or a methyl group, and $R_3$ represents a hydrogen atom, an alkyl group, such as methyl, ethyl, n-propyl, isopropyl, n-butyl, isobutyl, benzyl (phenylmethyl), etc., a monocyclic aryl group, such as phenyl, o-, m-, and p-tolyl, p-methoxyphenyl, etc., or a furyl group.

The condensation of the compounds represented by Formula I with those of Formulas II or III can advantageously be accelerated by heating. The particular temperature used can be varied, depending on the boiling point of the reactants. For example, the reaction can be accelerated by simply heating the reactants together under reflux. In general, I have found that a temperature of from about 100 to 200° C. is useful in practicing my invention. While an inert medium can be employed, if desired, there is generally no advantage in using such a medium, inasmuch as such use merely necessitates an additional purification step in the removal of the solvent.

The intermediates selected from those represented by Formula I above have been previously described in the art. See, for example, Brooker and White U. S. Patent 2,646,409, issued July 21, 1953; Dent and Brooker U. S. Patent 2,537,880, issued January 9, 1951; and Pittman U. S. Patent 2,521,944, issued September 12, 1950.

The intermediates selected from those represented by Formulas II and III above are also well known in the art. Representative ketones include, for example, 1-acetonaphthone, acetophenone, isophorone, methyl 2-thienyl ketone, p-dimethylaminoacetophenone, 2,5-dimethyl acetophenone, 9-acetylphenanthrene, 3,5-dimethyl-2-cyclohexene-1-one, 5-ethyl-3-methyl-2-cyclohexene-1-one, 5- furyl-3-methyl-2-cyclohexene-1-one, 3-methyl-5-phenyl-2-cyclohexene-1-one, etc.

The condensation of the compounds of Formula I with those of Formula II results in the formation of intermediates, useful in the preparation of photographic sensitizing dyes, having the following general formula:

IV.
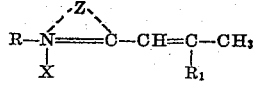

wherein R, R₁, X and Z each have the values given above. In lieu of using the quaternary salt represented by Formula I, the corresponding base can be used together with the appropriate alkyl salt, i. e. R=X, wherein R and X have the values given above. The quaternary salt is thus formed in situ.

The condensation of the compounds of Formula I with those of Formula III results in the formation of intermediates, useful in the preparation of photographic sensitizing dyes, represented by the following general formula:

V.
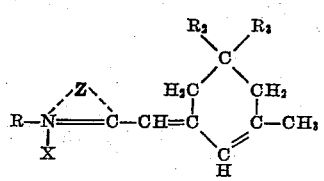

wherein R, R₂, R₃, X and Z each have the values given above.

The intermediates represented by Formula V above are new. Certain of the intermediates represented by Formula IV are also new, such as those wherein R₁ represents a phenanthryl group, a naphthyl group, a 2-thienyl group, etc.

The following examples will serve to illustrate more fully the manner whereby I practice my invention.

*Example 1.—3-ethyl-2-(2-α-naphthylpropenyl)benzothiazolium iodide*

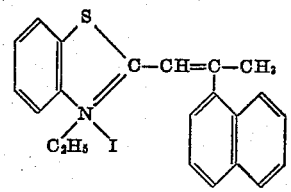

3 - ethyl - 2 - methylbenzothiazolium - p - toluenesulfonate (1 mol., 34.9 g.) and 1-acetonaphthone (2 mols., 34.0 g.) were mixed in a 500 ml. flask fitted with an air condenser and a water takeoff. The reaction mixture was heated in an oil bath at 165° C. for 16 hours, and then poured into a 1000 ml. beaker. The crude product was then stirred mechanically with water (100 ml.) and six 200 ml. portions of ether. The aqueous portion was then filtered, treated with sodium iodide (20 g.), chilled overnight and the product filtered off, washed with water, and dried. After recrystallization from ethyl alcohol, the yield of purified product was 6.8 g. (15%), M. P. 227–228° C. dec.

*Analysis.*—Calcd. for C₂₂H₂₀INS: C, 57.8; H, 4.4; I, 27.8. Found: C, 58.0; H, 4.5; I, 28.1.

*Example 2.—3-ethyl-2-(2-phenyl)propenylbenzothiazolium-p-toluenesulfonate*

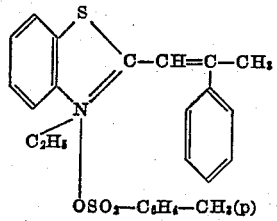

3 - ethyl - 2 - methylbenzothiazolium - p - toluenesulfonate (1 mol., 69.8 g.) and acetophenone (2 mols., 48 g.) were mixed and heated for five minutes under reflux in a flask fitted with a condenser and a water take-off. The hot reaction mixture was poured onto ice (200 g.) and mechanically stirred and extracted with four 200 ml. portions of ether. The ether solutions were decanted and the aqueous portion chilled overnight. The crude product was filtered off, washed with water and dried. After recrystallization from water, the yield of purified product was 4.85 g., M. P. 125–126° C. Treatment of the combined aqueous filtrates with sodium iodide yielded an additional 4.5 g. as the iodide. The combined yield of product was then 11%.

*Example 3.—3-ethyl-2-(1,5,5-trimethyl-3-cyclohexenylidene)methylbenzothiazolium iodide*

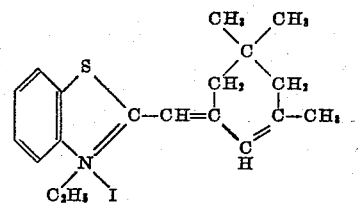

3 - ethyl - 2 - methylbenzothiazolium - p - toluenesulfonate (1 mol., 34.9 g.) and isophorone (2 mols., 27.6 g.) were mixed in a 500 ml. flask fitted with an air condenser and a water take-off. The reaction mixture was heated in an oil bath at 140° C. for 16 hours and then poured hot into a 1500 ml. beaker and mechanically stirred with 200 ml. water. The mixture was extracted with five 200 ml. portions of ether and then the aqueous portion was treated with an aqueous solution of sodium iodide (15 g. in water (50 ml.)). After chilling overnight, the crude product was filtered off, thoroughly washed with water and dried. After recrystallization from ethyl alcohol, the yield of purified product was 14.7 g. (35%), M. P. 233–234° C. dec.

*Example 4.—3-ethyl-2-[2-(2-thienyl)propenyl]benzothiazolium p-toluenesulfonate*

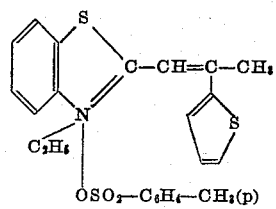

3 - ethyl - 2 - methylbenzothiazolium p - toluenesulfonate (34.9 g., 1 mol.) and methyl-2-thienylketone (13.9 g., 1 mol. plus 10%) were mixed and heated in an oil bath at 130–135° C. for 16 hours. The reaction mixture was then poured into water (100 ml.) with stirring. The mixture was then stirred and extracted with four 200 ml. portions of ether. The product crystallized from the aqueous portion, was filtered off, washed with water and ether, and dried. After two recrystallizations from methyl alcohol, the yield of pure product was 5.2 grams (11%). M. P. 150–1° C. dec.

*Example 5.—3-ethyl-2-[2-(2-thienyl)propenyl]naphtho[1,2]-thiazolium iodide*

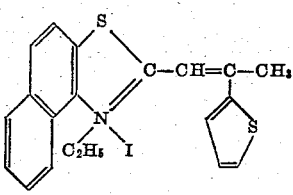

1 - ethyl - 2 - methylnaphtho[1,2]thiazolium p - toluenesulfonate (39.9 g., 1 mol.) and methyl-2-thienylketone (13.9 g., 1 mol. plus 10%) were mixed and heated on the oil bath at 130–135° C. for 16 hours in a flask fitted with a water take-off and an air condenser. The reaction mixture was then stirred with water (500 ml.) and four 500 ml. portions of ether. The ether was decanted and steam passed into the mixture until the total volume was 2500 ml. The aqueous solution was then stirred with Super Cel (a diatomaceous earth) (10 g.), filtered, and treated with sodium iodide (20 g.). After chilling overnight, the crude product was filtered off, boiled with water (250 ml.), filtered hot and dried. The yield of crude product was 4.6 grams (10%). After two recrystallizations from methyl alcohol, the yield of pure product was 5%. M. P. 215–216° C. dec.

*Example 6.—3-ethyl-2-[2-(p-dimethylaminophenyl)propenyl]benzothiazolium iodide*

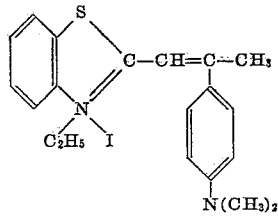

3 - ethyl - 2 - methylbenzothiazolium p - toluenesulfonate (34.9 g., 1 mol.) and p-dimethylaminoacetophenone (16.3 g., 1 mol.) were mixed and heated on an oil bath at 135–140° C. for 24 hours. The reaction mixture was poured into water (800 ml.) and mechanically stirred with 400 ml. portions of ether. A fifth portion of ether was added and the stirring continued until the sticky solid became crystalline. The aqueous portion was then filtered and 6.1 g. of the product isolated as the p-toluenesulfonate. Treatment of the aqueous filtrate with sodium iodide (5 g.) yielded an additional 2.1 g. as the iodide. After two recrystallizations from methyl alcohol, the iodide had M. P. 218–19° C. dec.

*Example 7.—3-ethyl-2-[2-(2,5-dimethylphenyl)propenyl]benzothiazolium iodide*

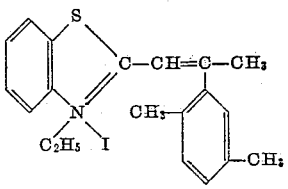

3 - ethyl - 2 - methylbenzothiazolium p - toluenesulfonate (34.9 g., 1 mol.) and 2,5-dimethylacetophenone (16.3 g., 1 mol. plus 10%) were mixed and heated on the oil bath at 135–140° C. for 4 days. The reaction mixture was poured into water (800 ml.) and extracted with two 1000 ml. portions of ether. The aqueous portion was then treated with sodium iodide (20 g.) and chilled overnight. The crude product was filtered off and recrystallized from water. The yield of pure product was 14.2 g. (33%). M. P. 200–201° C. dec.

*Example 8.—3-ethyl-2-[2-(9-phenanthryl)propenyl]benzothiozolium iodide*

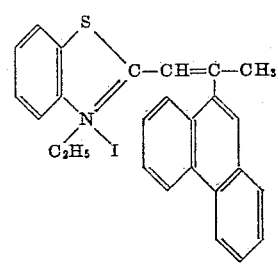

3 - ethyl - 2 - methylbenzothiazolium p - toluenesulfonate (34.9 g., 1 mol.) and 9-acetylphenanthrene (22.0 g., 1 mol.) were mixed and heated on an oil bath at 135–140° C. for 2 days. The reaction mixture was poured into water (800 ml.) and stirred with four 400 ml. portions of ether. The ether was decanted and the aqueous portion treated with sodium iodide (20 g.) and chilled overnight. The water was decanted and the residue stirred with ethyl alcohol until crystalline, chilled, and filtered. The yield of product was 12.7 g. (25%). M. P. 110–111° C.

*Example 9. — 1-ethyl-2-(2-p-hydroxyphenyl)propenyl-naphtho[1,2]-thiazolium iodide*

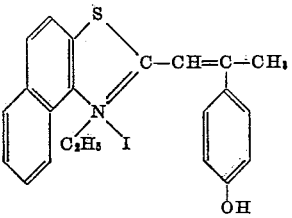

1 - ethyl - 2 - methylnaptho[1,2]thiazolium p-toluenesulfonate (39.9 g., 1 mol.) and p-hydroxyacetophenone (27.2 g., 1 mol. plus 100%) were mixed and heated on the oil bath at 165–170° C. for 24 hours. The crude reaction mixture was poured into a 2000 ml. beaker and mechanically stirred with water (400 ml. and four 500 ml. portions of ether. The ether and water solutions were decanted and the residue extracted with boiling water (3 liters). The aqueous solution was filtered and treated with stirring and with sodium iodide (10 g.) and then chilled overnight. The crude product was filtered off, boiled with 600 ml. water and filtered hot, washed with water and ether and dried. The yield after two recrystallizations from methyl alcohol with 2.05 g. M. P. 247–8° C. dec.

*Example 10.—1 - methyl - 2 - [2 - (1 - naphthyl)propenyl] naphtho [1,2] - thiazolium iodide*

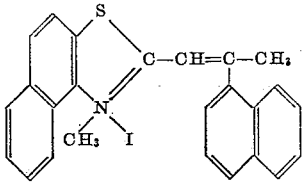

1,2-dimethylnaphtho[1,2]thiazolium p-toluenesulfonate (38.5 g., 1 mol.) and 1-acetonaphthone (18.7 g., 1 mol. plus 10%) were mixed and heated on the oil bath at 140–145° C. for 2 days. The crude reaction mixture was poured into water (1000 ml.) and stirred with four 500 ml. portions of ether. The ether solutions were discarded and the aqueous portion stirred with sodium iodide (20 g.). The water was decanted and the residue boiled with two 500 ml. portions of water and the water decanted. The residue was then dissolved in boiling acetone, filtered, and chilled overnight. The product was then filtered off, washed with acetone and dried. The yield was 5.1 g. (10.4%). M. P. 172–4° C. dec.

*Example 11.—5 - chloro - 3 - ethyl - 2 - (1,5,5 - trimethyl-3 - cyclohexenylidene) - methylbenzothiazolium p - toluenesulfonate*

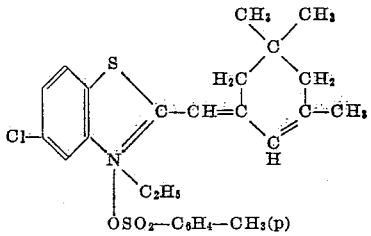

5-chloro-3-ethyl-2-methylbenzothiazolium p-toluenesulfonate (38.4 g., 1 mol.) and isophorone (27.6 g., 1 mol. plus 100%) were mixed and heated on the oil bath at 135–140° C. for 16 hours. The hot reaction mixture was poured into a beaker and mechanically stirred with water (400 ml.) and five 300 ml. portions of ether. The ether and water solutions were decanted and the residue dissolved in boiling water (1200 ml.), filtered, and chilled overnight. The product was then filtered off, washed with water and acetone and dried. The yield of desired product was 18.3 g. (36%). M. P. 233–4° C. dec.

*Example 12.—3 - ethyl - 2 - (1,5,5 - trimethyl - 3 - cyclohexenylidene) - methylbenzoxazolium iodide*

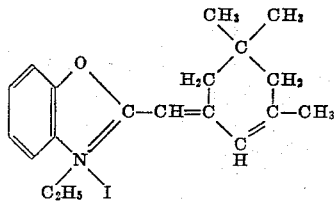

2-methylbenzoxazole (13.3 g., 1 mol.), ethyl p-toluenesulfonate (20.0 g., 1 mol.) and isophorone (27.6 g., 1 mol. plus 100%) were mixed and heated on the oil bath at 135–140° C. for 16 hours. The reaction mixture was then poured into water (600 ml.) and mechanically stirred with four 500 ml. portions of ether. An additional 500 ml. of ether was added and the mixture stirred with sodium iodide (20 g.). After chilling for several days, the crystalline product was filtered off, stirred with a little acetone, chilled, filtered, and dried. The yield of product was 4.3 g. (10.4%). M. P. 217–18° C. dec.

*Example 13.—3 - ethyl - 2 - (1,5,5 - trimethyl - 3 - cyclohexenylidene) methylbenzoselenazolium iodide*

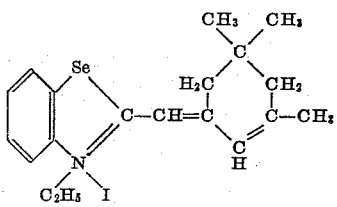

2-methylbenzoselenazole (19.6 g., 1 mol.) and diethylsulfate (15.4 g., 1 mol.) were mixed and heated at 70° C. on the oil bath for 24 hours. Isophorone (27.6 g., 1 mol. plus 100%) was then added and the mixture heated at 135–140° C. for 16 hours. The reaction mixture was poured into water (800 ml.) and stirred with four 500 ml. portions of ether. The ether was decanted and the aqueous portion treated with sodium iodide (20 g.). The water was decanted and the residue washed with water, boiled with acetone, chilled, filtered, and dried. The yield of product was 8.5 g. (18%). M. P. 223–4° C. dec.

*Example 14.—2 - (1,5 - dimethyl - 3 - cyclohexenylidene) - methyl - 3 - ethylbenzothiazolium iodide*

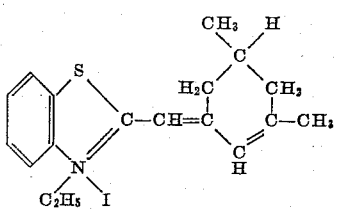

3-ethyl - 2 - methylbenzothiazolium p - toluenesulfonate (34.9 g., 1 mol.) and 3,5-dimethyl-2-cyclohexene-1-one (24.8 g., 1 mol. plus 100%) were mixed and heated at 135–140° C. for 16 hours. The reaction mixture was poured into water (400 ml.) and stirred with four 500 ml. portions of ether. The ether solutions were decanted and the aqueous portion was treated with sodium iodide (20 g.) and chilled overnight. The aqueous solution was then decanted, the residue washed with water, and stirred with acetone until crystalline. After recrystallization from ethyl alcohol, the yield of product was 6.5 g. (16%). M. P. 236–7° C. dec.

*Example 15.—1-ethyl-2-(1,5,5-trimethyl-3-cyclohexenylidene)methylnaphtho[1,2]thiazolium iodide*

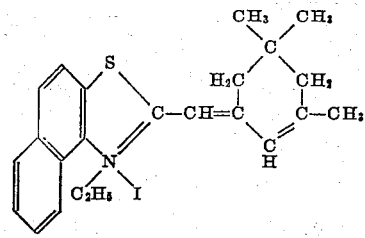

1-ethyl-2-methylnaphtho[1,2]thiazolium p-toluenesulfonate (39.9 g., 1 mol.) and isophorone (27.6 g., 1 mol. plus 100%) were mixed and heated in an oil bath at 165–170° C. for 24 hours. The reaction mixture was poured into a beaker and mechanically stirred with water (400 ml.) and five 400 ml. portions of ether. The ether and water solutions were decanted and the residue extracted with boiling water (300 ml.). The aqueous solution was then filtered, stirred with sodium iodide and chilled overnight. The crude product was filtered off, washed with water, stirred with acetone, filtered, and dried. After recrystallization from ethyl alcohol, the yield was 10.8 g. (23%). M. P. 208–9° C. dec.

*Example 16.—1-ethyl-2-(1,5,5-trimethylcyclohexenylidene)methylnaphtho[2,1]thiazolium iodide*

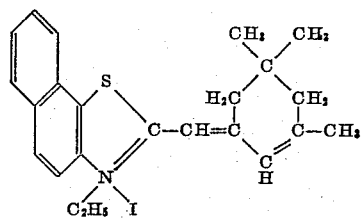

2-methylnaphtho[2,1]thiazole (39.8 g., 1 mol.), ethyl p-toluenesulfonate (40 g., 1 mol.) and isophorone (30.3 g., 1 mol. plus 10%) were mixed in a 500 ml. flask fitted with a water take-off and an air condenser. The reaction mixture was heated in an oil bath at 135–140° C. for 3 days. The reaction mixture was then poured into water (800 ml.) and stirred and extracted with four 800 ml. portions of ether. The ether solutions were discarded and the aqueous layer decanted. The residue was then extracted with boiling water (800 ml.) and the aqueous solutions combined, saturated with ammonium chloride and chilled overnight. The product was filtered, dissolved in water (100 ml.) and converted to the bromide by the addition of sodium bromide (10 g.). The crude bromide was filtered off, washed with acetone and dried. Yield 6.5 g. An additional 7.3 g. was isolated as the iodide by treating the combined filtrates with sodium iodide (20 g.). The crude iodide was boiled with two 400 ml. portions of water, washed with acetone and dried. The combined yield was 15.3% and the iodide after recrystallization from methyl alcohol had M. P. 252–3° C. dec.

Operating in a similar manner, other cyclammonium quaternary salts selected from those represented by Formulas II and III. As noted above, the resulting intermediates represented by Formulas IV and V can advantageously be employed through condensation with ICI intermediates or Dains intermediates to produce polymethine dyes useful in altering the sensitivity of photographic silver halide emulsions. The preparation of such dyes is described in my copending application Serial No. 400,810 filed on even date herewith (now U. S. Patent 2,734,900, issued February 14, 1956).

What I claim as my invention and desired secured by Letters Patent of the United States is:

1. A process for making heterocyclic compounds comprising reacting a compound selected from those represented by the following general formula:

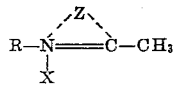

wherein R represents an alkyl group, X represents an anion, and Z represents the non-metallic atoms necessary to complete a heterocyclic nucleus selected from the group consisting of those of the thiazole series, those of the benzothiazole series, those of the naphthothiazole series, those of the benzoxazole series, those of the naphthoxazole series, those of the benzoselenazole series, those of the naphthoselenazole series, and those of the thiazoline series with a ketone selected from those represented by the following general formula:

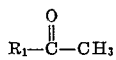

wherein $R_1$ represents a member selected from the group consisting of a 2-thienyl group and an aromatic carbocyclic group containing from 6 to 14 carbon atoms.

2. A process for preparing heterocyclic compounds comprising reacting a compound selected from those represented by the following general formula:

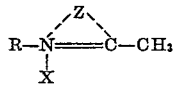

wherein R represents an alkyl group having the formula $C_nH_{2n+1}$ wherein $n$ represents a positive integer of from 1 to 4, X represents an anion, and Z represents the non-metallic atoms necessary to complete a heterocyclic nucleus of the benzothiazole series, with a ketone selected from those represented by the following general formula:

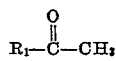

wherein $R_1$ represents an aromatic carbocyclic group containing from 6 to 14 carbon atoms.

3. A process for preparing heterocyclic compounds comprising reacting a compound selected from those represented by the following general formula:

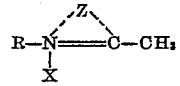

wherein R represents an alkyl group having the formula $C_nH_{2n+1}$ wherein $n$ represents a positive integer of from 1 to 4, X represents an anion, and Z represents the non-metallic atoms necessary to complete a heterocyclic nucleus of the naphthothiazole series, with a ketone selected from those represented by the following general formula:

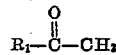

wherein $R_1$ represents an aromatic carbocyclic group containing from 6 to 14 carbon atoms.

4. A process for preparing heterocyclic compounds comprising reacting a compound selected from those represented by the following general formula:

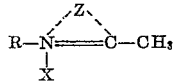

wherein R represents an alkyl group having the formula $C_nH_{2n+1}$ wherein $n$ represents a positive integer of from 1 to 4, X represents an anion and Z represents the non-metallic atoms necessary to complete a heterocyclic nucleus of the benzothiazole series, with acetophenone.

5. A process for preparing heterocyclic compounds comprising reacting a compound selected from those represented by the following general formula:

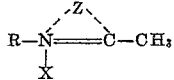

wherein R represents an alkyl group having the formula $C_nH_{2n+1}$ wherein $n$ represents a positive integer of from 1 to 4, X represents an anion and Z represents the non-metallic atoms necessary to complete a heterocyclic nucleus of the naphthothiazole series, with p-hydroxyacetophenone.

6. A process comprising reacting 3-ethyl-2-methyl-benzothiazolium-p-toluenesulfonate together with acetophenone.

7. A process comprising reacting 1-ethyl-2-methylnaphtho [1,2] thiazolium p-toluenesulfonate with p-hydroxyacetophenone.

8. A process comprising reacting 3-ethyl-2-methylbenzothiazolium p-toluenesulfonate with methyl-2-thienyl ketone.

9. A process comprising reacting 1-ethyl-2-methyl naphtho [1,2] thiazolium p-toluenesulfonate with methyl-2-thienyl ketone.

10. A process comprising reacting 3-ethyl-2-methylbenzothiazolium p-toluenesulfonate with 9-acetylphenanthrene.

References Cited in the file of this patent
UNITED STATES PATENTS

| | | |
|---|---|---|
| 2,028,141 | Ackermann | Jan. 21, 1936 |
| 2,107,379 | Koslowsky | Feb. 8, 1938 |
| 2,126,078 | Zeh | Aug. 9, 1938 |
| 2,231,659 | Brooker | Feb. 11, 1941 |
| 2,450,400 | Thompson | Sept. 28, 1948 |
| 2,541,015 | Van Lare et al. | Feb. 13, 1951 |

FOREIGN PATENTS

| | | |
|---|---|---|
| 625,907 | Great Britain | July 6, 1949 |

OTHER REFERENCES

Skraup et al.: Ber. Deut. Chem., vol. 59B, p. 1014 (1926).
Naiman et al.: JACS, vol. 57, pp. 1660-3 (1935).
Brown et al.: J. Org. Chem., vol. 15, pp. 174-6 (1950).
Smet et al.: Chem. Abst., vol. 45, col. 607 (1951).